US012233640B2

(12) United States Patent
Muraoka

(10) Patent No.: US 12,233,640 B2
(45) Date of Patent: Feb. 25, 2025

(54) PRINTING APPARATUS AND PRINTING METHOD

(71) Applicant: Shuhou Co., Ltd., Fukui (JP)

(72) Inventor: Kouji Muraoka, Fukui (JP)

(73) Assignee: Shuhou Co., Ltd., Fukui (JP)

( * ) Notice: Subject to any disclaimer, the term of this patent is extended or adjusted under 35 U.S.C. 154(b) by 0 days.

(21) Appl. No.: 17/605,688

(22) PCT Filed: May 17, 2021

(86) PCT No.: PCT/JP2021/018567
§ 371 (c)(1),
(2) Date: Nov. 24, 2022

(87) PCT Pub. No.: WO2022/244043
PCT Pub. Date: Nov. 24, 2022

(65) Prior Publication Data
US 2024/0017540 A1 Jan. 18, 2024

(51) Int. Cl.
*B41F 17/00* (2006.01)
*B41F 16/00* (2006.01)
(Continued)

(52) U.S. Cl.
CPC ........ *B41F 17/001* (2013.01); *B41F 16/0086* (2013.01); *B41F 17/30* (2013.01); *B41M 1/40* (2013.01)

(58) Field of Classification Search
None
See application file for complete search history.

(56) References Cited

U.S. PATENT DOCUMENTS

2007/0017391 A1* 1/2007 Kley-Bosler ......... B41F 17/001 101/41
2007/0097189 A1 5/2007 Umeda et al.
(Continued)

FOREIGN PATENT DOCUMENTS

CN 108290430 A 7/2018
CN 110770034 A 2/2020
(Continued)

OTHER PUBLICATIONS

International Search Report (PCT/ISA/210) and Written Opinion (PCT/ISA/237) mailed on Jul. 20, 2021, by the Japan Patent Office as the International Searching Authority for International Application No. PCT/JP2021/018567.
(Continued)

*Primary Examiner* — Joshua D Zimmerman
(74) *Attorney, Agent, or Firm* — BUCHANAN, INGERSOLL & ROONEY PC

(57) ABSTRACT

A printing apparatus includes: a printing pad having a surface that is deformable to a shape of a surface to be printed; a printing original plate having a surface on which ink is placed; a plate stage on which the printing original plate is placed; a printing stage on which an item to be printed is placed; and a head configured to print an image on the printing original plate by an ink jet system. The printing pad is configured to be moveable between an area above the plate stage and an area above the printing stage, and to move perpendicularly to and vertically from and to the plate stage or the printing stage. The head includes a plurality of storage portions to store each of a plurality of inks including intermediate color ink, and nozzles configured to discharge each of the plurality of inks toward the printing original plate.

10 Claims, 11 Drawing Sheets

(51) Int. Cl.

| | |
|---|---|
| ***B41F 17/30*** | (2006.01) |
| ***B41M 1/40*** | (2006.01) |

(56) References Cited

U.S. PATENT DOCUMENTS

| | | | | |
|---|---|---|---|---|
| 2009/0207198 | A1 | 8/2009 | Muraoka | |
| 2020/0039207 | A1* | 2/2020 | Muraoka | B41F 35/00 |
| 2020/0215815 | A1* | 7/2020 | Muraoka | B41F 17/26 |

FOREIGN PATENT DOCUMENTS

| | | | |
|---|---|---|---|
| JP | H03142249 | A | 6/1991 |
| JP | 2006130725 | A | 5/2006 |
| JP | 2007118379 | A | 5/2007 |
| WO | 2018235165 | A1 | 12/2018 |

OTHER PUBLICATIONS

Office Action issued on Jun. 12, 2024, in corresponding Chinese Patent Application No. 202180003240.5 and machine English translation of the Office Action. (14 pages).
Office Action issued Korean Application No. 10-2021-7034773; dated Sep. 9, 2024. 7 Pages (including English Translation).
Office Action (The Second Office Action) issued on Nov. 11, 2024, in corresponding Chinese Patent Application No. 202180003240.5 and machine English translation of the Office Action. (27 pages).
Office Action (Notification of reasons for refusal) issued on Jan. 14, 2025, in corresponding Japanese Patent Application No. 2023-521992 and machine English translation of the Office Action. (7 pages).

* cited by examiner

PRINTING APPARATUS AND PRINTING METHOD

TECHNICAL FIELD

The present disclosure relates to offset printing, and particularly to a printing apparatus and a printing method that make use of an ink jet system.

BACKGROUND ART

Conventionally, in an offset printing method, a printing pad is used, and the printing pad (also referred to as "printing pad") is pushed against a printing original plate on which ink is placed in a pattern corresponding to a print pattern to transfer the ink in the print pattern to the printing pad. Then, the printing pad is pushed against a surface to be printed to transfer the transferred ink to the surface to be printed, so that the print pattern is printed on the surface to be printed.

In offset printing, printing is performed as follows. Printing is performed on the printing original plate by an ink jet system, a print image on the printing original plate is transferred to the printing pad, and the printing pad is then pushed against a body to be printed. To allow printing on the printing original plate by the ink jet system, ink used in the printing is caused to have low viscosity. Ultraviolet ray (UV) curable ink is used for the ink. Before the print image is transferred to the printing pad, the UV curable ink on the printing original plate is semi-cured by irradiating the UV curable ink with ultraviolet rays to allow the ink on the printing original plate that forms the print image to be transferred to the printing pad without being distorted (see Patent Literature 1, for example). A method is also known where air that passes through a heater is caused to impinge on ink on the printing original plate to evaporate a solvent in the ink and to semi-cure the ink before the print image is transferred to the printing pad (see Patent Literature 2, for example).

According to the printing methods disclosed in Patent Literatures 1 and 2, red ink, blue ink, yellow ink, and black ink are discharged onto the printing original plate from nozzles formed on the head to form dots of respective colors that are arranged within a predetermined range at a predetermined ratio, so that an image can be expressed. The inks of respective colors arranged on the printing original plate are semi-cured and, thereafter, are transferred to the printing pad, and are then pushed against the surface of an item to be printed.

CITATION LIST

Patent Literature

Patent Literature 1: Japanese Unexamined Patent Application Publication No. 2006-130725

Patent Literature 2: International Publication No. WO 2018/235165

SUMMARY OF INVENTION

Technical Problem

According to the disclosure disclosed in Patent Literatures 1 and 2, inks of four colors of red, blue, yellow, and black are used for printing inks, and some of these inks are arranged at a predetermined ratio per unit area, so that a print image can be obtained. However, according to the printing method disclosed in Patent Literatures 1 and 2, there is a limitation on the number of dots of ink arranged per unit area and hence, there is a problem that there is a limitation on the ratio of dots of a plurality of color inks arranged per unit area, so that slight differences in color cannot be expressed.

The present disclosure has been made to solve the above-mentioned problem, and it is an object of the present disclosure to obtain a printing apparatus and a printing method in which a print image formed on a printing original plate by an ink jet system is transferred to a body to be printed from the printing original plate by using a printing pad with improved accuracy of colors that can be expressed.

Solution to Problem

A printing apparatus according to an embodiment of the present disclosure includes: a printing pad having a printing surface that is deformable to conform to a shape of a surface to be printed; a printing original plate having a placement surface on which ink is placed; a printing original plate stage on which the printing original plate is placed; a printing stage on which an item to be printed having the surface to be printed is placed and fixed; and a head configured to print an image on the printing original plate by an ink jet system, the printing pad being configured to be moveable between an area above the printing original plate stage and an area above the printing stage, and being configured to move perpendicularly to and vertically from and to the printing original plate stage or the printing stage, the head including a plurality of storage portions configured to store a plurality of inks including intermediate color ink, and nozzles configured to discharge each of the plurality of inks toward the printing original plate.

A printing method that uses the above-mentioned printing apparatus includes: a printing original plate preparation step of discharging a plurality of inks of different colors including intermediate color ink to the printing original plate from the head by an ink jet system to print the image on the printing original plate; an ink drying step of evaporating a solvent contained in the plurality of inks forming the image on the printing original plate to increase a viscosity of the plurality of inks; a transfer step of transferring the image to a surface of the printing pad; and a printing step of pushing the printing pad against an item to be printed.

Advantageous Effects of Invention

With the printing apparatus and the printing method according to an embodiment of the present disclosure, full-color (multi-color) printing can be performed on the printing original plate by the ink jet system by one step without replacing the printing original plate and hence, it is possible to perform printing of an image at a higher definition compared with the conventional technique.

DESCRIPTION OF EMBODIMENTS

Embodiment 1

Figure 1:
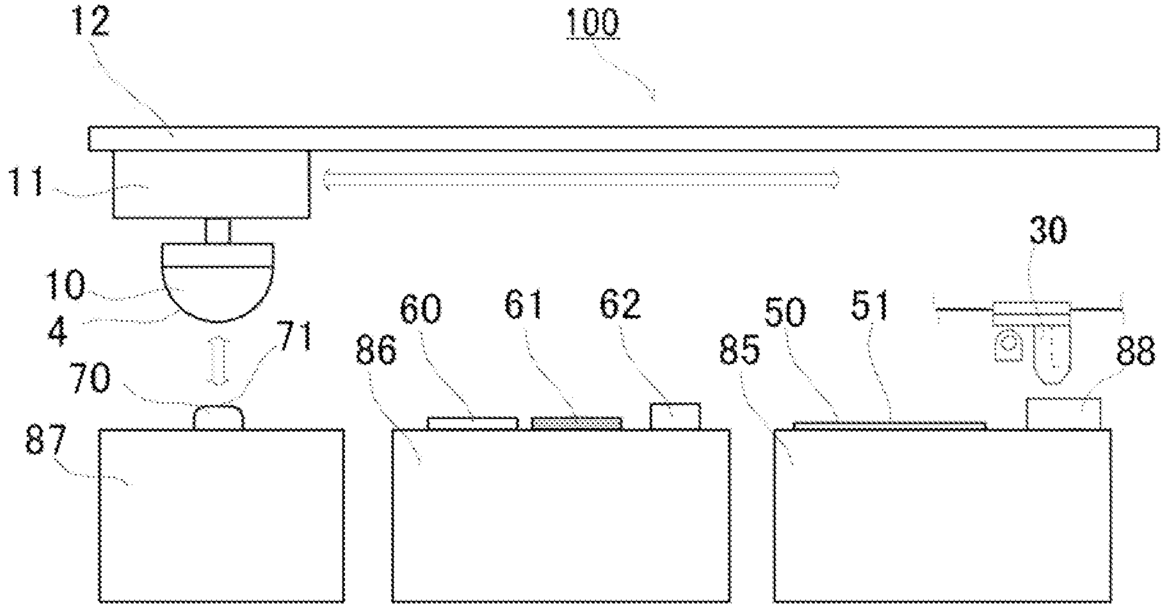
FIG. 1 is a side view showing one example of a printing apparatus 100 according to Embodiment 1.

Hereinafter, a printing apparatus and a printing method according to the present disclosure will be described with reference to drawings. The present disclosure is not limited by an embodiment described hereinafter. In the respective drawings, identical components are given the same reference signs, and the description of such components is partially omitted. The respective drawings are schematically drawn, and the present disclosure is not limited to the shape shown in the drawings. Further, in the specification, an elastic body or a body having elasticity is not limited to a body having a linear relationship between the load applied to the body and the amount of deformation generated by the load. The elastic body or the body having elasticity includes a body where the load applied to the body and the amount of deformation generated by the load have a non-linear relationship, and the shape of the body returns to the original shape when the applied load is removed immediately or after a predetermined time period.

<Printing Apparatus 100>

FIG. 1 is a side view showing one example of a printing apparatus 100 according to Embodiment 1. The printing apparatus 100 includes a printing pad 10 that can move linearly in the vertical direction. The printing pad 10 is a pad that pushes a printing surface 4 against a surface to be printed 71 of an item to be printed 70 when the printing pad 10 is vertically moved by a vertically moving device 11 included by the printing apparatus 100. The printing apparatus 100 also includes a horizontally moving device 12. The horizontally moving device 12 moves the printing pad 10 and the vertically moving device 11 in the horizontal direction.

The printing pad 10 is, by the horizontally moving device 12, moved to an area above a cleaning device 60, an activation device 61, an air blowing device 62, or a printing original plate 50 in addition to an area above the item to be printed 70. The printing pad 10 is vertically moved by the vertically moving device 11, so that the printing surface 4 is pushed against the item to be printed 70, the cleaning device 60, the activation device 61, or the printing original plate 50. In FIG. 1, the printing apparatus 100 includes, from the left, a printing stage 87, a surface treatment stage 86, and a printing original plate stage 85. The item to be printed 70 is placed on the printing stage 87. The cleaning device 60 is provided to the surface treatment stage 86. The surface treatment stage 86 includes an activation device 61 and an air blowing device 62. The printing original plate 50 is placed on the printing original plate stage 85. A cleansing device 88 that cleanses a head 30 may be provided to the printing original plate stage 85. However, in the printing apparatus 100, these stages may be freely arranged, and the arrangement may be suitably changed to the convenience of the operator or the location where the printing apparatus 100 is installed. Further, there may be a case where the cleaning device 60, the activation device 61, the air blowing device 62, or the cleansing device 88 of the printing apparatus 100 is not installed in the printing apparatus 100.

<Printing Pad 10>

Figure 2:
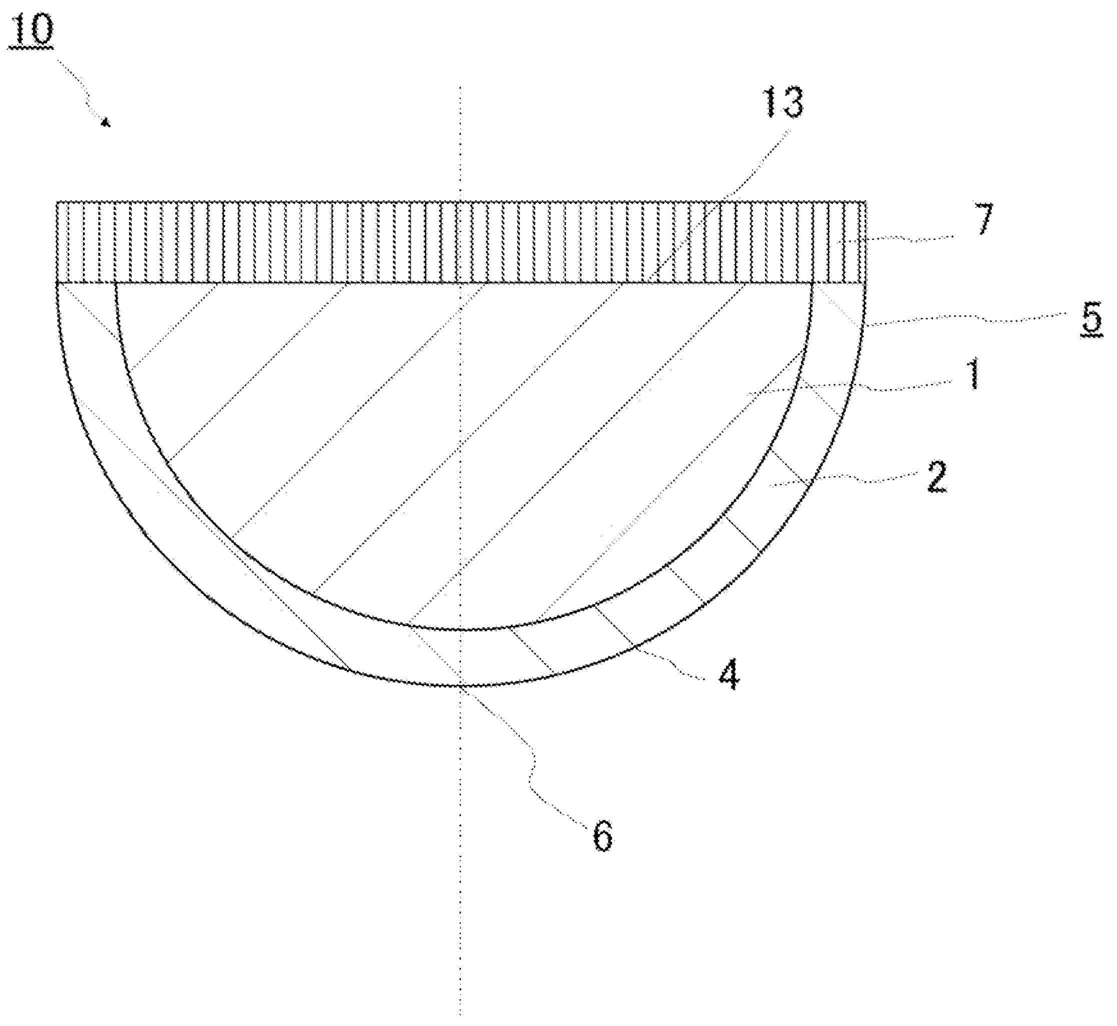
FIG. 2 is a cross-sectional view showing one example of a printing pad included by the printing apparatus 100 according to Embodiment 1.

FIG. 2 is a cross-sectional view showing one example of the printing pad 10 included by the printing apparatus 100 according to Embodiment 1. FIG. 2 shows a cross section taken along a plane that passes through a top portion 6 of the printing pad 10 and that is perpendicular to a flat surface 13 to which a base 5 is fixed. As shown in FIG. 2, the base 5 of the printing pad 10 has an inner layer 1 and an outer layer 2 that covers the surface of the inner layer 1. The printing pad 10 shown in FIG. 2 has a substantially hemispherical shape, for example. The shape of the printing pad 10 is not limited to such a shape. The printing pad 10 may be suitably changed to, for example, a cannonball shape, a shape having a curved surface obtained by rotating a parabola about the axis of symmetry of the parabola, a shape of a portion of an ellipsoid obtained by cutting the ellipsoid or other shape, a shape obtained by contiguously extending the cross section of the cannonball shape or a semicircular shape along a straight line, or other shapes corresponding to the specifications or other factor of the item to be printed 70. The printing pad 10 has a top portion 6 that comes into contact with the item to be printed 70 or the printing original plate 50 first, and the top portion 6 is in the form of a point or a line. With such a configuration, when the printing pad 10 is pushed against the item to be printed 70 or the printing original plate 50, there is no possibility that air is caught between the printing surface 4 and the item to be printed 70 or the printing original plate 50. Therefore, it is possible to prevent the generation of a void in a print image applied to the item to be printed 70. In Embodiment 1, of the surface of the printing pad 10, a predetermined range centered about a top portion 6 forms the printing surface 4 to which ink is moved from the printing original plate 50 to transfer the ink to the item to be printed 70.

<Base 5>

The base 5 is formed by molding silicone rubber, for example. The base 5 has elasticity (flexibility), and silicone oil is mixed to facilitate deformation. In Embodiment 1, the base 5 has a substantially hemispherical shape. However, the shape of the base 5 may be suitably changed corresponding to the specifications or other factor of the item to be printed 70. The base 5 is deformed when the printing pad 10 is pushed against the printing original plate 50 to cause ink 40 (see FIG. 3) placed on a placement surface 51 of the printing original plate 50 to move to the printing surface 4. The ink 40 placed on the placement surface 51 of the printing original plate 50 is arranged corresponding to an image to be printed on the item to be printed 70, thus forming a print pattern according to a print image. As long as the base 5 can deliver the ink 40 to surfaces to be printed 71, 72, and 73 when the printing pad 10 is pushed against the surfaces to be printed 71, 72, and 73, a material for forming the base 5 is not limited.

Figure 3:
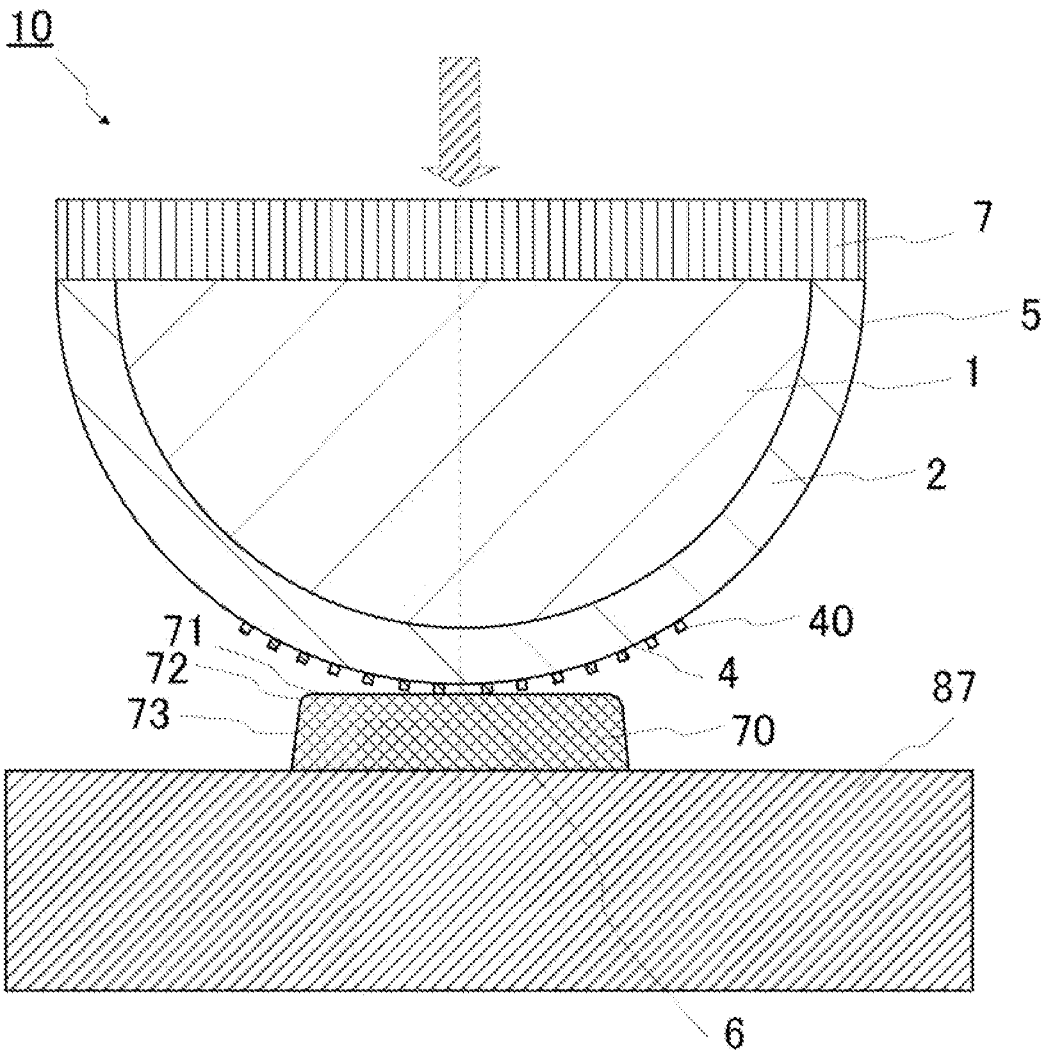
FIG. 3 is a cross-sectional view when the printing pad 10 included by the printing apparatus 100 according to Embodiment 1 is pushed against an item to be printed 70.
Figure 4:
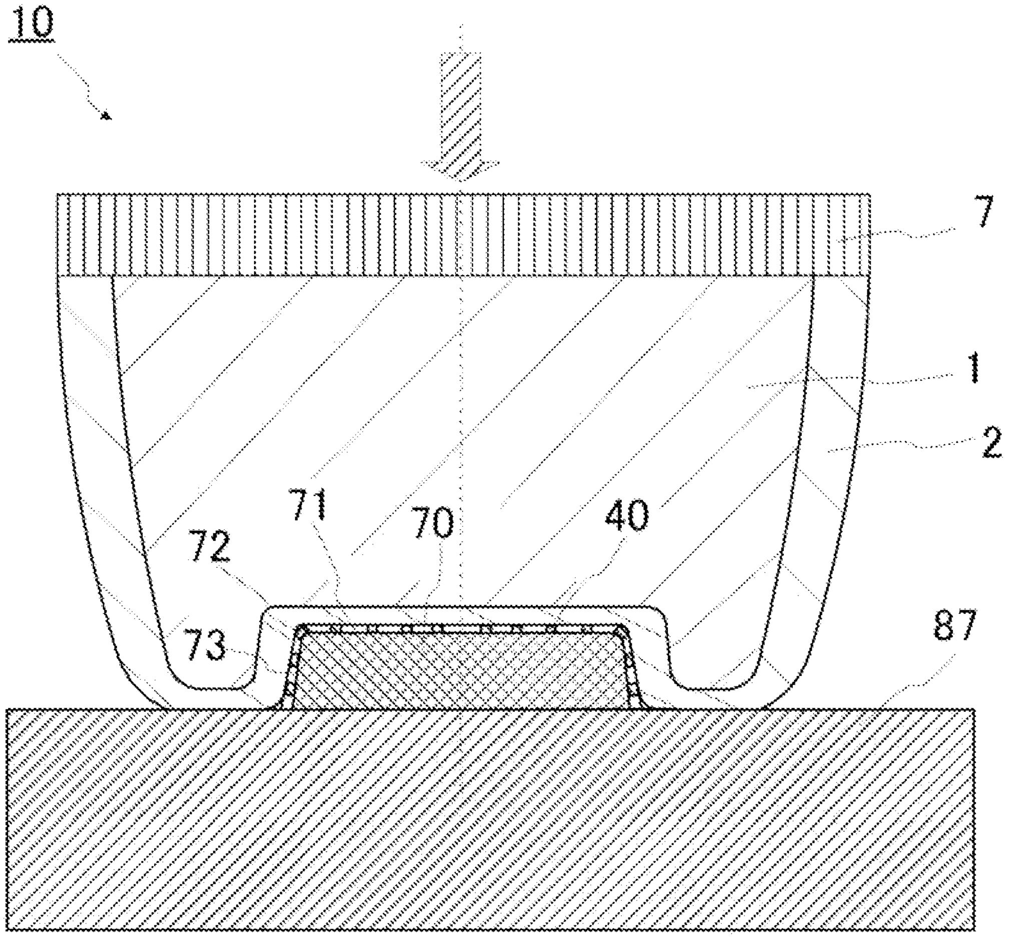
FIG. 4 is a cross-sectional view when the printing pad 10 included by the printing apparatus 100 according to Embodiment 1 is pushed against the item to be printed 70.

FIG. 3 and FIG. 4 are cross-sectional views when the printing pad 10 included by the printing apparatus 100 according to Embodiment 1 is pushed against the item to be printed 70. For example, the base 5 may be made of two materials having different hardnesses. In such a case, for example, a material of the outer layer 2, forming a portion close to the printing surface 4, is set to a material having Asker C hardness in a range from 50 to 70 points. A material for forming the inner layer 1, disposed inside the outer layer 2, is set to a material having Asker C hardness of 100 points. The inner layer 1 is disposed at a position where the inner layer 1 can apply a force for pushing the printing surface 4 against the surfaces to be printed 71, 72, and 73 during printing, and is positioned closer to a support part 7 than is the outer layer 2. The support part 7 is a portion that is connected to the vertically moving device 11, and that transfers a force from the vertically moving device 11 to the printing pad 10. In FIG. 3 and FIG. 4, Asker C hardness of the upper portion of the base 5 is set to 100 points, and Asker C hardness of the lower portion of the base 5 (a portion of the base 5 where the top portion 6 is positioned) is set in a range from 50 to 70 points. To allow the printing pad 10 to be deformed to conform to the surfaces to be printed 71, 72, and 73, it is desirable to set hardness of the printing pad 10 to a low level. Therefore, hardness of the portion of the printing pad 10 including the printing surface 4, pushed against the item to be printed 70, is set to a lower level than the upper portion. Such a configuration allows the shape of the entire printing pad 10 to be easily held. In addition to the above, the outer layer 2, which is directly pushed against the surfaces to be printed 71, 72, and 73, has an advantageous effect that the outer layer 2 can be easily deformed to conform not only to the surface to be printed 71, but also to the surface to be printed 72, which is a curved surface, and the surface to be printed 73, which is inclined to a direction along which the printing pad 10 moves. However, hardnesses of the respective portions of the base 5 are not limited to the above-mentioned hardnesses.

<Cleaning Device 60>

As shown in FIG. 1, the surface treatment stage 86 is disposed adjacent to the printing stage 87 of the printing apparatus 100. The cleaning device 60 is installed on the surface treatment stage 86. The cleaning device 60 includes a piece of paper or an adhesive tape, for example. The printing surface 4 of the printing pad 10 is pushed against the surface of the piece of paper or the adhesive tape, so that the ink 40, stains, dust and other substance remaining after printing are removed.

<Activation Device 61>

The activation device 61 includes a storage tank that stores liquid, and an absorbing unit that absorbs and holds the liquid. When the printing surface 4 of the printing pad 10 is pushed against the surface of the absorbing unit, the liquid held by the absorbing unit thereby adheres to the printing surface 4 of the printing pad 10. The printing pad 10 is a pad where water or solvent is caused to adhere to or permeate into the base 5 to facilitate transfer of the ink 40 placed on the printing original plate 50 to the printing surface 4. A liquid is suitably selected on the basis of its properties having compatibility with the ink 40, and the liquid has properties of softening the hard ink 40. The ink 40 is, for example, a mixture of a synthetic resin, such as an acrylic resin and a urethane resin, and water, thinner, xylene, toluene, or other substance. It is preferable to select a mixture having a high affinity for a solvent contained in the ink 40. However, a liquid used for the activation device 61 is not limited to the above.

The absorbing unit of the activation device 61 is formed by laminating thin absorbing materials each having a sheet shape, for example. The absorbing material may be a piece of paper, for example. However, the absorbing material is not limited to only a piece of paper. As long as the absorbing material absorbs liquid, the absorbing material may be made of any of other materials, such as a cloth and a resin. For example, the absorbing unit may be a unit obtained by laminating pieces of paper on a sponge-like resin. There may be a case where stains, such as the ink 40 remaining on the printing surface 4 of the printing pad 10, adhere to the surface of the absorbing unit, against which the printing surface 4 of the printing pad 10 is pushed, or a case where a piece of paper included in the absorbing unit is torn as the surface of the absorbing unit is scratched. For this reason, the absorbing unit is formed such that the laminated pieces of paper can be remove one by one by peeling off and removing the piece of paper positioned in the uppermost layer of the absorbing unit from the uppermost layer of the absorbing unit, or an upper layer portion can be mechanically replaced. However, a method of replacing a piece of paper positioned in the uppermost layer is not limited to the above. The absorbing unit is formed such that a piece of paper or other material forming the uppermost layer can be removed or replaced and hence, the surface of the absorbing unit is always maintained clean, and liquid permeates through the surface of the absorbing unit. Therefore, pushing the printing surface 4 of the printing pad 10 against the absorbing unit can activate a printing surface.

<Air Blowing Device 62>

The air blowing device 62 is a device that adjusts an amount of water or solvent caused to adhere to the printing surface 4 of the printing pad 10 by the activation device 61 to an appropriate amount. The air blowing device 62 removes excess water or solvent from the printing surface 4 by blowing air toward the printing surface 4. Note that the type of the air blowing device 62, the number of air blowing devices 62, and a direction along which air is blown are not limited.

<Printing Original Plate Stage 85>

Figure 5:
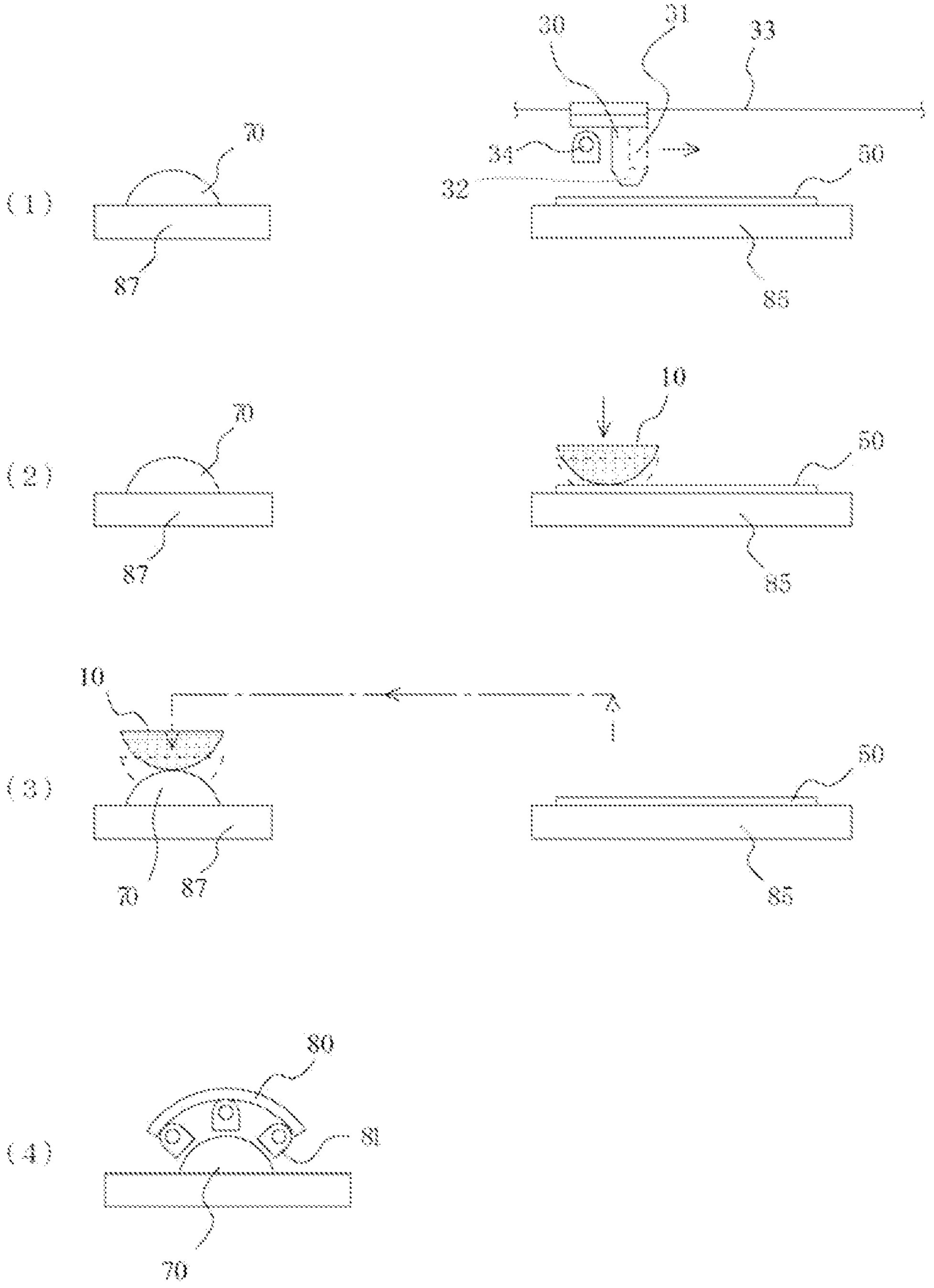
FIG. 5 is an explanatory view for describing the steps of performing printing by using the printing pad 10, according to Embodiment 1, that has a curved surface, that is, a hemispherical shape, a semi-cylindrical shape, a parabolic surface, or other shapes.

FIG. 5 is an explanatory view for describing the steps of performing printing by using the printing pad 10, according to Embodiment 1, that has a curved surface, that is, a hemispherical shape, a semi-cylindrical shape, a parabolic surface, or other shapes. FIG. 5 is an explanatory view obtained by extracting the printing original plate stage 85 shown in FIG. 1. The printing original plate 50 is placed on the upper surface of the printing original plate stage 85, and the head 30 is installed above the printing original plate 50 such that the head 30 can be moved in a horizontal direction. As shown in FIG. 5(1), the head 30 is provided to place ink on the surface of the printing original plate 50 by an ink jet system, and is configured to be moveable along a moving rail 33.

<Printing Original Plate 50>

The printing original plate 50 is placed on the printing original plate stage 85. When ink 40 is placed on a placement surface 51 and a printing surface 4 of the printing pad 10 is pushed against the placement surface 51, the ink 40 is transferred to the printing surface 4. As disclosed in Japanese Patent Application No. 9-39431 (Japanese Unexamined Patent Application Publication No. 10-235989, Title of Invention: method for performing offset printing by ink jet system) filed by the applicant of the present disclosure, an aluminum plate or other materials adjusted to have appropriate surface roughness is used for the printing original plate 50. The printing original plate 50 is configured to be adjusted to have appropriate surface roughness, so that substantial surface energy is adjusted and hence, ink placed on the printing original plate 50 by the ink jet system is appropriately retained. That is to say, when surface energy is excessively small, ink is repelled by the surface of the printing original plate 50 and hence, sufficient "ink retention" cannot be expected. In contrast, when surface energy is excessively large, ink is diffused on the printing original plate 50 and hence, a print image formed by ink cannot be appropriately transferred to the surface of the printing pad 10. In view of the above, an aluminum plate adjusted to have surface roughness of 1.5 s to 3 s (JIS), for example, is used for the printing original plate 50 and hence, ink can be preferably retained on the printing original plate 50, so that ink can be preferably transferred to the printing pad 10. However, the printing original plate 50 is not limited to the above-mentioned mode, and may adopt another mode provided that ink can be preferably transferred to the printing pad 10.

<Head 30>

The head 30 is provided to form a high definition print image on the surface of the printing original plate 50 by arranging dots of inks of a plurality of colors on the surface of the printing original plate 50 by the ink jet system. The head 30 includes a plurality of storage portions 31 and nozzles 32, the plurality of storage portions 31 each storing one of inks of a plurality of different colors, the nozzles 32 being provided to discharge inks stored in the storage portions 31. Each nozzle 32 has a small hole to arrange ink on the surface of the printing original plate 50 as fine droplets. The viscosity of the ink 40 is set to a low value to allow the ink 40 to pass through the small hole. For example, the viscosity of the ink 40 is adjusted to 0.1 mPa·s to 1 mPa·s. The viscosity of the ink 40 may be adjusted to a more suitable value, that is, 0.5 mPa·s to 0.7 mPa·s. The ink 40 is obtained by causing a pigment, a monomer, a synthetic resin, a dispersant, a photopolymerizable material, a photopolymerization initiator and the like to be stirred and dispersed into a solvent. The ratio of the solvent in the ink 40 is suitably adjusted. A drying device 34 is disposed in the vicinity of the head 30 to increase the viscosity of ink on the printing original plate.

Figure 6:
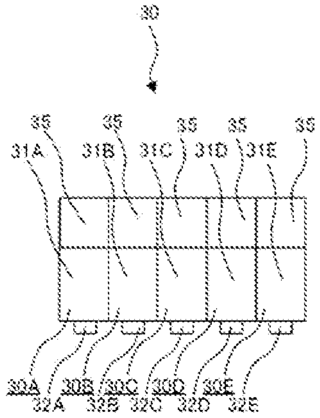
FIG. 6 is a schematic view for describing a structure of a head 30 according to Embodiment 1.

FIG. 6 is a schematic view for describing the structure of the head 30 according to Embodiment 1. FIG. 6 schematically shows the detailed structure of the head 30, and a specific structure may be suitably changed. In Embodiment 1, the head 30 includes heads 30A, 30B, 30C, 30D and 30E. The head 30A includes a storage portion 31A and a pressure device 35 provided to cause ink in the storage portion 31A to be discharged from a nozzle 32A. In the same manner, the heads 30B to 30E respectively include storage portions 31B to 31E and the pressure devices 35 provided to cause inks to be respectively discharged from nozzles 32B to 32E. In other words, the head 30 includes the plurality of storage portions 31, the plurality of nozzles 32, and the plurality of pressure devices 35.

In the head 30 shown in FIG. 6, different inks 40 are stored in each of the heads 30A to 30E. In general, in printing performed by the ink jet system, inks of three primary colors and black color referred to as "key" are used, for example, red ink, blue ink, yellow ink, and black ink are used. These inks are arranged on the surface of an item to be printed 70 as fine dots to form a print image. Colors of the print image perceived by an observer are varied by varying the ratio of the number of dots of the red ink, the blue ink, the yellow ink, and the black ink arranged per unit area. For the inks 40 of the three primary colors, for example, magenta ink may be used for red, and cyan ink may be used for blue. The head 30 of Embodiment 1 shown in FIG. 6 includes, in addition to the heads 30A to 30D into which inks of four colors of red, blue, yellow, and black are respectively filled, the head 30E that stores intermediate color ink of the inks 40 of the four colors, for example. The plurality of inks 40 including the intermediate color ink may be respectively filled into the heads 30A to 30E in any order. The intermediate color ink is an ink that is obtained by mixing inks of the three primary colors and that has a hue other than the three primary colors.

For example, in the head 30 shown in FIG. 6, black ink is stored in the head 30A, red ink is stored in the head 30B, blue ink is stored in the head 30C, and yellow ink is stored in the head 30D. Intermediate color ink is stored in the head 30E. The intermediate color ink is an ink 40 having a hue different from hues of the inks 40 stored in the heads 30A to 30D, and is obtained by separating a print image to be printed on the item to be printed 70 into a plurality of hues. For example, it is preferable that a print image to be printed on the item to be printed 70 is separated into a plurality of hues and, of the separated hues, the hue having the highest ratio be set for the intermediate color ink. For example, in a case of printing a woodgrain pattern where a base hue is brown, of a plurality of hues forming a print image, browns have a large ratio, and a brown having a relatively high lightness is adopted for the intermediate color ink. With such a configuration, the print image is expressed by dots of the intermediate color ink and dots of other inks 40 of red ink, blue ink, yellow ink, and black ink and hence, differences in color between respective portions of the woodgrain pattern can be expressed more precisely. Particularly, in the printing that uses the printing pad 10, there is a limitation on the number of dots of the ink 40 arranged per unit area on the surface of the printing pad 10. However, when intermediate color ink is used, the number of dots of ink used for brown, being the base hue of a print image, can be reduced and hence, dots of the inks 40 of other colors can be arranged by a corresponding amount whereby differences in color between the respective portions can be expressed in more detail.

The head 30 is not limited to the configuration where intermediate color ink is stored in only one of the heads 30A to 30E. Inks of different intermediate colors may be stored in two or more of the heads 30. For example, in a case of having the same base hue, such as a woodgrain pattern, inks of different intermediate colors may be stored in all storage portions 31 of the head 30. In this case, differences in color between the respective portions of the woodgrain pattern can be expressed with the small number of dots and hence, the woodgrain pattern can be expressed at a higher definition.

<Modification of Printing Pad 10>

Figure 7:
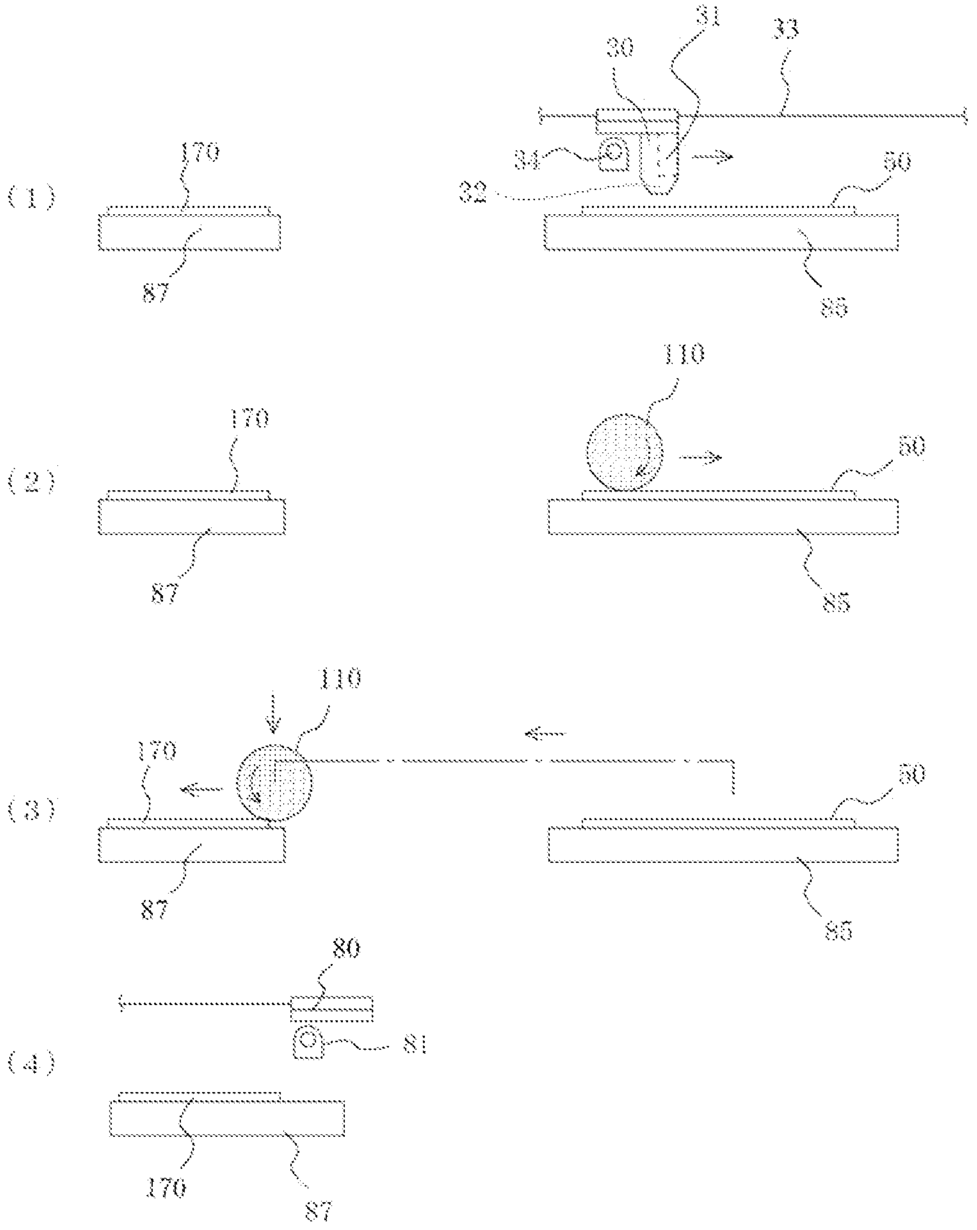
FIG. 7 is an explanatory view for describing the steps of performing printing by using a printing pad 110 in the printing apparatus 100 according to Embodiment 1.

FIG. 7 is an explanatory view for describing the steps of performing printing by using a printing pad 110 in a printing apparatus 100 according to Embodiment 1. The printing pad 10 used in the printing apparatus 100 is not limited to the printing pad shown in FIG. 5 that is moved and pushed in a perpendicular direction against the printing original plate 50 or the item to be printed 70. In FIG. 7, the printing pad 110 is formed into a columnar shape, and is configured to rotate along the surface of the printing original plate 50 or the item to be printed 70. The printing pad 110 is not only pushed in the perpendicular direction against the printing original plate 50 or the item to be printed 70, but also rotated and moved on the surface of the printing original plate 50 in a state where the printing pad 110 is pushed against the printing original plate 50 or the item to be printed 70. The printing pad 110 can perform printing with high accuracy on an item to be printed 170 having a flat surface shape or a shape having less unevenness. However, in a case shown in FIG. 3 and FIG. 5 where the item to be printed 70 has a large protruding portion, there is a limitation on a range where the printing can be performed by the printing pad 110.

<Printing Method that Uses Printing Apparatus 100>

Figure 8:
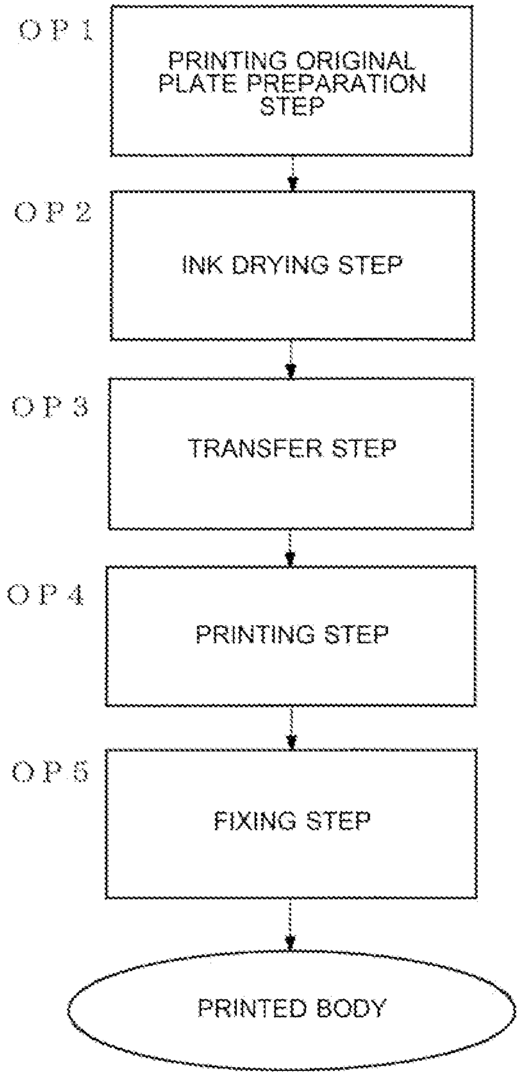
FIG. 8 shows the flow of a printing method performed by the printing apparatus 100 according to Embodiment 1.

FIG. 8 shows the flow of a printing method performed by the printing apparatus 100 according to Embodiment 1. Hereinafter, the printing method performed by the printing apparatus 100 will be described with reference to FIG. 5 and FIG. 7.

(Printing Original Plate Preparation Step OP1)

As shown in FIG. 8, in the printing method, first, a printing original plate preparation step OP1 is performed in which a print image is formed on the placement surface 51 of the printing original plate 50. As shown in FIG. 5, the printing original plate 50 has a flat plate shape, and is placed on the printing original plate stage 85. In Embodiment 1, the printing original plate 50 is a thin flat plate made of an aluminum alloy. However, a sheet material that is referred to as “design receiving sheet” and that has retentivity of and excellent affinity for UV ink may also be used for the printing original plate 50. Further, the sheet material can have increased retentivity of and affinity for ink by forming unevenness on the sheet material. The surface of the printing original plate 50 is finished to have predetermined surface roughness. The head 30 is configured such that the head 30 can be moved in the horizontal direction by a feeding device not shown in the drawing at least in an area above the printing original plate 50. Alternatively, a configuration may be adopted where the printing original plate 50 can be moved relative to the head 30. The head 30 forms an image under computer control. As shown in FIG. 4 and FIG. 5, even in a case of performing offset printing on the item to be printed 70 having a curved surface, the same printing original plate preparation step OP1 is performed. In a case of performing printing by the ink jet system, a print image is obtained by discharging fine ink drops from the nozzles and by blowing the ink drops to the printing original plate 50. The head 30, in addition to the storage portions 31 and the nozzles 32 for inks of four colors of red, blue, yellow, and black, for example, includes the storage portion 31 that stores intermediate color ink having intermediate color of the four colors, and includes the nozzle 32 that discharges the intermediate color ink. The head 30 arranges dots of inks of five different colors including at least the intermediate color ink on the surface of the printing original plate 50.

(Ink Drying Step OP2)

After the printing original plate preparation step OP1 is finished, an ink drying step OP2 is performed. Immediately after the printing original plate preparation step OP1 is finished, the viscosity of the ink 40 on the printing original plate 50 is low. If the low viscosity of the ink 40 on the printing original plate 50 is maintained, the ink 40 is distorted and is not transferred to the printing pad 10 with high accuracy when the printing pad 10 is pushed against the ink 40 on the printing original plate 50. Further, accuracy of a print image is reduced due to oozing of the ink 40, for example. For this reason, in the ink drying step OP2, a solvent contained in the ink 40 is evaporated to increase the viscosity of the ink 40.

In the ink drying step OP2, air is sent to the ink 40 on the printing original plate 50 or the printing original plate 50 is heated to evaporate the solvent in the ink 40. Alternatively, for example, the ink 40 may be subject to natural air drying for a predetermined time period in a state where the printing original plate 50 is placed on the printing original plate stage 85. The solvent has higher volatility than other components in the ink 40. The viscosity of ink is increased in such a manner that the solvent is evaporated from the ink 40 by sending air or other methods to increase the ratio of other components in the ink. When the ink drying step OP2 is completed, the viscosity of the ink 40 is adjusted to 3 Pa·s to 1000 Pa·s. It is desirable that the time period during which ink is dried be set corresponding to the time period required for performing a transfer step OP3 and a printing step OP4, that are steps performed after the ink drying step OP2. With such a configuration, the printing can be continuously performed on a large number of items to be printed 70, 170 efficiently.

When the process advances from the printing original plate preparation step OP1 to the ink drying step OP2, the printing original plate 50 may be moved from the printing original plate stage 85, or may remain on the printing original plate stage 85. In the case where the printing original plate 50 is moved from the printing original plate stage 85, another printing original plate 50 can be immediately placed on the printing original plate stage 85, thus allowing the printing original plate preparation step OP1 to be started. Therefore, there is an advantage that a cycle time of the entire offset printing process can be shortened.

The ink 40 on the printing original plate 50 is dried in such a manner that, for example, the drying device 34 including a blower and a heater, for example, is installed next to the head of the head 30, and air that passes through the heater is sent to an area above the printing original plate 50 by the blower. The heater installed together with the blower is set to a temperature as high as possible within a range of less than the boiling point of the solvent contained in the ink 40. A solvent that is not dried at the head portion of the head 30 but is semi-dried in the ink drying step OP2 is selected for the solvent contained in the ink 40. For example, a solvent having a flash point of 40 degrees C. or more and a boiling point of 120 degrees C. or more is selected. In such a case, the temperature of the heater installed next to the head of the head 30 is set to 100 degrees C., for example. To further stabilize the viscosity of the ink 40 after the ink drying step OP2 is completed, it is preferable to further adjust a photopolymerizable material and an initiator contained in the ink 40 at the ratio of ⅓ to ½ of the entire ink 40. A solvent having high solvency may damage the head of the head 30 and hence, it is desirable to use a solvent having low solvency. However, the ink 40 used in the printing apparatus 100 is not limited to the above-mentioned ink.

(Transfer Step OP3)

As shown in FIG. 5(2), in the transfer step OP3, in a case where printing is performed by using the printing pad 10 having a curved surface, such as a parabolic surface, the printing pad 10 is pushed against the printing original plate 50 from the top to transfer a print image. In a case where the printing pad 110 according to the modification that has a cylindrical shape is used, the printing pad 110 having a cylindrical shape is caused to rotate on the printing original plate 50. Then, the ink 40 placed on the printing original plate 50 is transferred to the surface of the printing pad 110.

(Printing Step OP4)

As shown in FIG. 5(3), in the printing step OP4, the printing pad 10 is pushed against the item to be printed 70. The ink 40 adhering to the surface of the printing pad 10 is transferred to the surface of the item to be printed 70. In a case where printing is performed by using the printing pad 10, even when the surface of the item to be printed 70 has a curved surface, the printing can be performed to conform to the shape of the curved surface. In a case where the surface of the item to be printed 70 has a flat plate shape or a curved surface close to a flat plate as shown in FIG. 7(3), printing may be performed by causing the printing pad 10 having a cylindrical shape to rotate on the surface of the item to be printed 70.

(Fixing Step OP5)

As shown in FIG. 5(4) and FIG. 7(4), in a fixing step OP5, the ink 40 transferred to the surface of the item to be printed 70 in the printing step OP4 is fixed. In a case where UV ink is used as the ink 40, an ultraviolet ray irradiation device 80 irradiates the surface of the item to be printed 70 with ultraviolet rays in this step to cure the ink 40. Alternatively, the ink 40 may be irradiated with an electron beam instead of ultraviolet rays. In a case where the shape of the item to be printed 70 has a curved surface as shown in FIG. 5(4), it is desirable to use the ultraviolet ray irradiation device that includes a plurality of light sources 81 configured to emit ultraviolet rays along the surface having the curved surface.

In the fixing step OP5, the ink 40 is not limited to be cured by being irradiated with ultraviolet rays or an electron beam. For example, the ink 40 may be cured by being heated by the heater or may be cured by being dried by sending air onto the ink 40. Further, the ink 40 may be cured by natural air drying.

<Action of Printing Apparatus 100>

Figure 9:
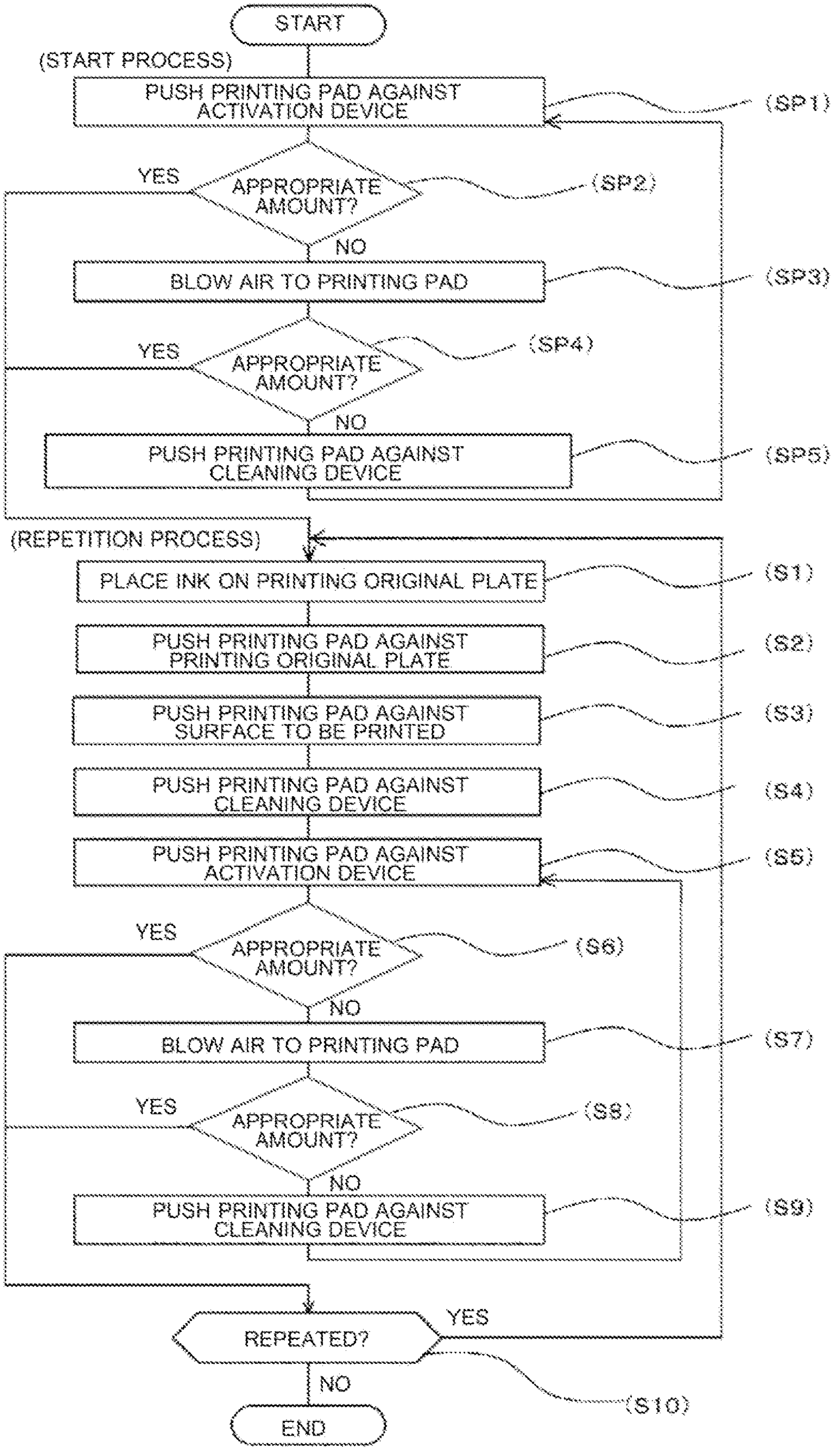
FIG. 9 shows the flow of the action of the printing apparatus 100 according to Embodiment 1.

FIG. 9 shows the flow of the action of the printing apparatus 100 according to Embodiment 1. In performing the above-mentioned printing method shown in FIG. 8, the printing apparatus 100 operates according to the flowchart shown in FIG. 9.

(Start Process)

A start process is a process performed immediately after the printing apparatus 100 is turned on. Immediately after the production of a printed item is started, there may be the case where the surface of the printing pad 10 is not activated. Therefore, a step where the printing surface 4 of the printing pad 10 is appropriately activated. First, after the printing apparatus 100 is turned on, the printing apparatus 100 causes the printing pad 10 to move to an area above the activation device 61 and, then, to move downward toward the activation device 61. After the printing surface 4 is pushed against the absorbing unit of the activation device 61, so that a predetermined range including the printing surface 4 is brought into contact with the absorbing unit, the printing pad 10 is elevated. Such an operation is referred to as an activation step (SP1). By performing such a step, liquid, such as water and solvent, permeating into the absorbing unit of the activation device 61 adheres to or permeates into the printing surface 4 of the printing pad 10. Unevenness is formed on the surface of the printing pad 10, so that the liquid permeates into the absorbing unit. This step is referred to as "start first step".

After the start first step is completed, it is determined whether or not the amount of liquid adhering to the printing surface 4 of the printing pad 10 is appropriate (SP2). When the amount of the liquid adhering to the printing surface 4 is not appropriate (NO in SP2), the printing apparatus 100 performs an air blowing step (SP3). In the air blowing step, the air blowing device 62 blows air to the printing surface 4 of the printing pad 10 to remove excess liquid adhering to the printing surface 4. The case where the amount of liquid adhering to the printing surface 4 is not appropriate means the case where the excessively large amount of liquid adheres to the printing surface 4. The above step is referred to as the start second step.

After the start second step is completed, it is determined whether or not the amount of liquid adhering to the printing surface 4 of the printing pad 10 is appropriate (SP4). When excess water or solvent still adheres to the printing surface 4 of the printing pad 10 (NO in SP4), the printing apparatus 100 performs an absorption step (SP5). In the absorption step, the printing apparatus 100 pushes the printing surface 4 of the printing pad 10 against the cleaning device 60. With such an operation, the excess liquid adhering to the printing surface 4 of the printing pad 10 is removed. The above step is referred to as the start third step.

When the amount of water or solvent adhering to or permeating into the printing pad 10 is appropriate, one or both of the air blowing step (SP3) and the absorption step (SP5) may be omitted. The order of performing the air blowing step and the absorption step may be changed. Further, the air blowing step and the absorption step may be performed a plurality of times.

(Repetition Process)

After the start process is completed, and the printing surface 4 of the printing pad 10 is appropriately activated, the process advances to a repetition process. The repetition process includes an ink placement step (S1), an ink transfer step (S2), a printing step (S3), a cleaning step (S4), an activation step (S5), an air blowing step (S7), and an absorption step (S9). As shown in FIG. 7, the printing apparatus 100 performs the ink placement step (S1), the ink transfer step (S2), the printing step (S3), the cleaning step (S4), the activation step (S5), the air blowing step (S7), and the absorption step (S9) in this order. However, the order of steps in the repetition process is not limited to such an order. For example, after the ink placement step (S1) and the ink transfer step (S2) are completed, the printing apparatus 100 performs steps from the printing step (S3) to the absorption step (S9). However, the printing apparatus 100 may perform the ink placement step (S1) of a next cycle in parallel while performing the steps from the printing step (S3) to the absorption step (S9).

An ink placement step (S1) corresponds to the printing original plate preparation step OP1 of the printing method shown in FIG. 8. An ink transfer step (S2) corresponds to the transfer step OP3 of the printing method shown in FIG. 8. A printing step (S3) corresponds to the printing step OP4 of the printing method shown in FIG. 8.

In the repetition process, the completion of the item to be printed 70 is reached each time the printing step (S3) is performed. The number of items to be printed 70 is not limited to one, and printing may be performed on a plurality of items to be printed simultaneously. In the case where the printing is performed on the plurality of items to be printed simultaneously, a plurality of printing pads 10 may be installed to the printing apparatus 100.

(Cleaning Step)

In the cleaning step (S4), the printing surface 4 of the printing pad 10 after the ink 40 is transferred to the surfaces to be printed 71, 72, and 73 is pushed against a flat cleaning surface of the cleaning device 60. The ink 40 remaining on the printing pad 10 is caused to adhere to the cleaning surface. The cleaning surface is a piece of paper or an adhesive tape. However, the material of the cleaning surface is not limited to the above.

(Activation Step, Air Blowing Step, Absorption Step)

The activation step (S5) is a step substantially equal to the activation step (SP1) in the start process. The air blowing step (S7) is a step substantially equal to the air blowing step (SP3) in the start process. The absorption step (S9) is also a step substantially equal to the absorption step (SP5) in the start process. The air blowing step (S7) and the absorption step (S9) are performed corresponding to the amount of liquid, such as water and solvent, adhering to the printing surface 4 of the printing pad 10. Either one of the air blowing step (S7) or the absorption step (S9) may be omitted, or at least one of the air blowing step (S7) and the absorption step (S9) may be performed a plurality of times. Each of the air blowing step (S7) and the absorption step (S9) is a step that is performed corresponding to the activation state of the printing surface 4 of the printing pad 10 after the state of the printing surface 4 is checked (S6 and S8) before the air blowing step (S7) or the absorption step (S9) is performed. When the state of the printing surface 4 of the printing pad 10 is checked in a checking step (S6 and S8), and the activation state of the printing surface 4 is appropriate, it is determined whether or not the printing is performed again in a repetition determination step (S10). When the printing is performed again (YES in S10), steps starting from the ink placement step (S1) is repeated again. When the printing is not repeated (NO in S10), the production of a printed item is finished.

As described above, the printing apparatus 100 is an apparatus that performs the start process when the printing apparatus 100 is turned on, and that performs the repetition process thereafter to print on a large number of items to be printed 70. If the printing pad 10 is in an activated state, the above-mentioned start process (SP1 to SP5) may be omitted.

(Advantageous Effects of Embodiment 1)

According to Embodiment 1, the printing apparatus 100 includes the printing pad 10 or 110, the printing original plate 50, the printing original plate stage 85, the printing stage 87, and the head 30, the printing pad 10 or 110 having the printing surface 4 that is brought into contact with a surface to be printed, the printing original plate 50 having the placement surface 51 on which the ink 40 is placed, the printing original plate 50 being placed on the printing original plate stage 85, the item to be printed 70 or 170 having the surface to be printed being placed and fixed on the printing stage 87, the head 30 being configured to print an ink image on the printing original plate 50 by the ink jet system. The printing pad 10 or 110 is configured to be moveable between an area above the printing original plate stage 85 and an area above the printing stage 87, and configured to move perpendicularly to and vertically from and to the printing original plate stage 85 or the printing stage 87. The head 30 includes the plurality of storage portions 31 and the nozzles 32, the plurality of storage portions 31 storing each of the plurality of inks, the nozzles 32 discharging each of the plurality of inks 40 toward the printing original plate 50. The plurality of storage portions 31 include at least five or more storage portions 31. With such a configuration, in the printing apparatus 100, the plurality of storage portions 31 of the head 30 can store each of inks of a plurality of colors and, particularly, intermediate color of a plurality of colors selected from red, blue, yellow, and black. Therefore, in a print image formed on the surface of the printing original plate 50 of the printing apparatus 100, different colors are expressed by combining dots of the plurality of colors, that is, the colors can be expressed by the combination of the intermediate color with conventional four colors of red, blue, yellow, and black. Conventionally, colors are expressed by arranging four colors at a certain ratio with the limited number of dots of inks per unit area. In contrast, according to the printing apparatus 100 of Embodiment 1, for example, printing can be performed with one additional intermediate color ink and hence, colors can be expressed by at least the conventional four colors and the one additional intermediate color ink. Therefore, for example, in a case where a significant portion of a print image is occupied by a specific hue, printing can be performed by using intermediate color ink that conforms to the specific hue. Accordingly, of dots of ink per unit area, the number of dots used for expressing the specific hue can be reduced and hence, the printing apparatus 100 can express slight differences in color whereby accuracy of the print image is increased.

Further, the printing apparatus 100 does not adopt a method where printing is directly performed on the item to be printed 70 by the ink jet system. In the printing apparatus 100, a print image formed on the printing original plate 50 is transferred to the item to be printed 70 by using the printing pad 10. Therefore, printing can be performed also on the surface to be printed having a three dimensional shape, such as the surfaces to be printed 71, 72 and 73 of the item to be printed 70, with high accuracy.

Intermediate color ink used for the printing is selected corresponding to a print image. Accordingly, each of the plurality of storage portions 31 of the head 30 is configured to be detachably mounted on the head 30. With such a configuration, intermediate color ink can be replaced easily and hence, the printing apparatus 100 can accommodate various items to be printed.

Figure 10:
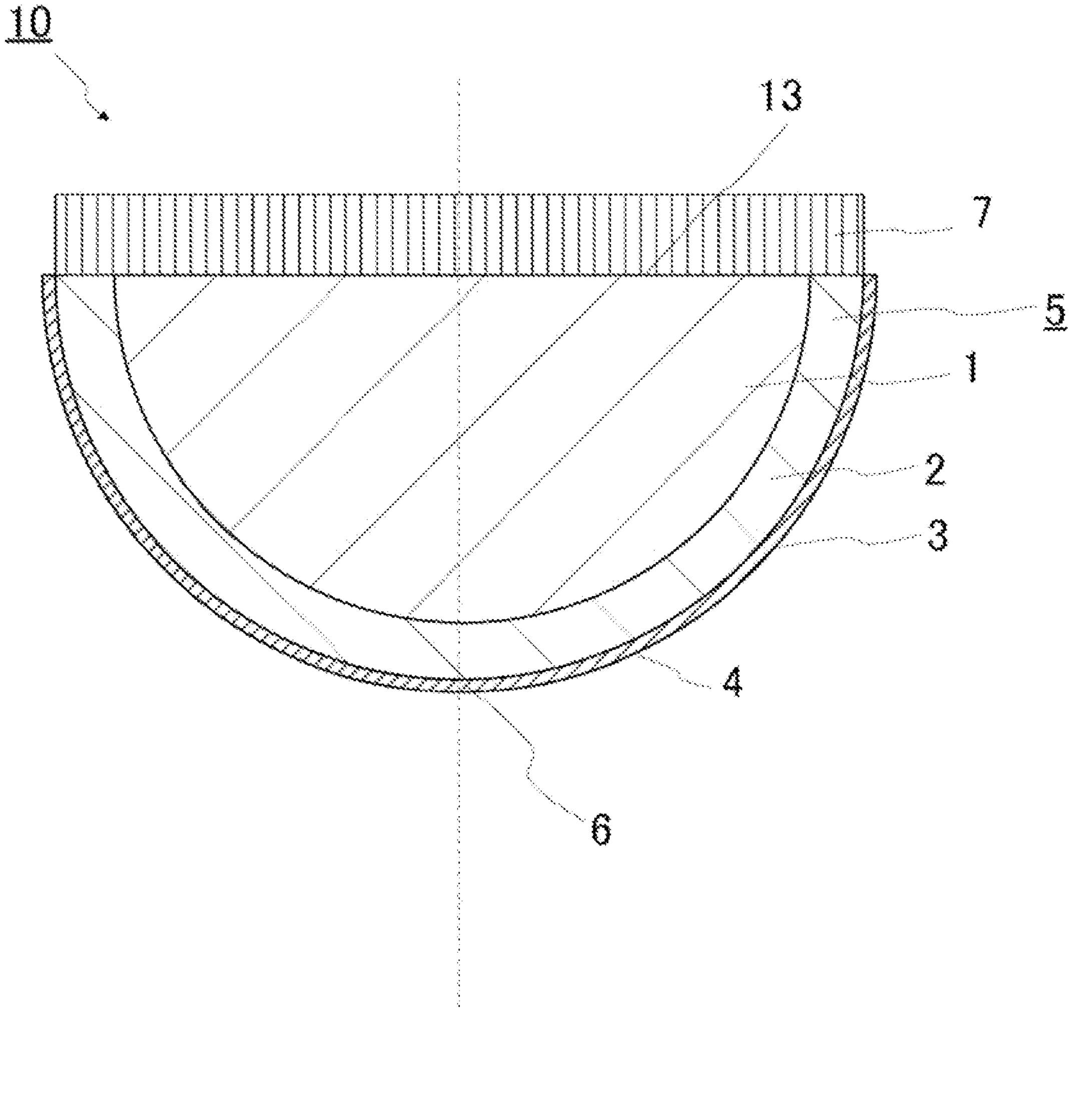
FIG. 10 shows a modification of the printing pad 10 used in the printing apparatus 100 of Embodiment 1.

FIG. 10 shows a modification of the printing pad 10 used in the printing apparatus 100 of Embodiment 1. The printing pad 10 according to Embodiment 1 may include a protective film layer 3 that covers the surface of the base 5. The protective film layer 3 forms the printing surface 4 that is an outside of the printing pad 10. The protective film layer 3 is formed by attaching a silicone rubber sheet with a thickness of 0.5 mm, for example, to the surface of the outer layer 2. The protective film layer 3 is provided to prevent silicone oil contained in soft silicone rubber forming the inner portion from oozing to the printing surface 4. Further, the outer surface of the protective film layer 3 forms the printing surface 4, and is repeatedly pushed against the printing original plate 50 and the surfaces to be printed 71, 72, and 73 and hence, it is necessary for the outer surface of the protective film layer 3 to have durability against scratches and wear. For this reason, the protective film layer 3 is formed using a material having higher hardness than that of the outer layer 2, and has a small thickness to conform to the surfaces to be printed 71, 72, and 73 when the printing surface 4 is pushed against the surfaces to be printed 71, 72, and 73. In Embodiment 1, the protective film layer 3 is formed with a thickness as small as possible. It is preferable to form the protective film layer 3 with a thickness of 0.1 mm to 1 mm, for example. The material of the protective film layer 3 is not limited to silicone rubber, and any material may be suitably selected as long as the material conforms to the deformation of the inner layer 1 and the outer layer 2. Further, it is desirable that the protective film layer 3 has sufficient stretchability to allow the protective film layer 3 to be attached along the surface of the base 5 in a step of attaching the protective film layer 3 to the base 5. The printing pad 10 may further have a multilayer structure. For example, it is also possible to allow the inner layer 1 or the outer layer 2 of the printing pad 10 shown in FIG. 10 to have a multilayer structure made of materials having further different hardnesses.

The protective film layer 3 is attached to the surface of the base 5. When damage, such as scratches and wear, occurs on the protective film layer 3, the protective film layer 3 may be peeled off from the surface of the base 5 and replaced with a new protective film layer. The protective film layer 3 is less expensive than the base 5, and replacing the protective film layer 3 allows the base 5 disposed inside the protective film layer 3 to be directly used without any change. Therefore, renewing the protective film layer 3 allows the expensive base 5 to be repeatedly used, and it is possible to maintain the printing surface 4 of the printing pad 10 in a state suitable for printing. As a result, the printing apparatus 100 according to Embodiment 1 can reduce cost required for printing. In FIG. 10, the base 5 is formed by the inner layer 1 and the outer layer 2. However, the base 5 may have only one layer formed by the inner layer 1. In other words, the protective film layer 3 may be provided to the base 5 having only one layer formed by the inner layer 1. However, there may be a case where the base 5 is damaged through an operation of peeling the protective film layer 3, or the surface of the base 5 is subjected to deterioration, such as hardening, when the protective film layer 3 attached to the base 5 is replaced. Therefore, it is desirable that the base 5 has a multilayer as shown in FIG. 10.

Figure 11:
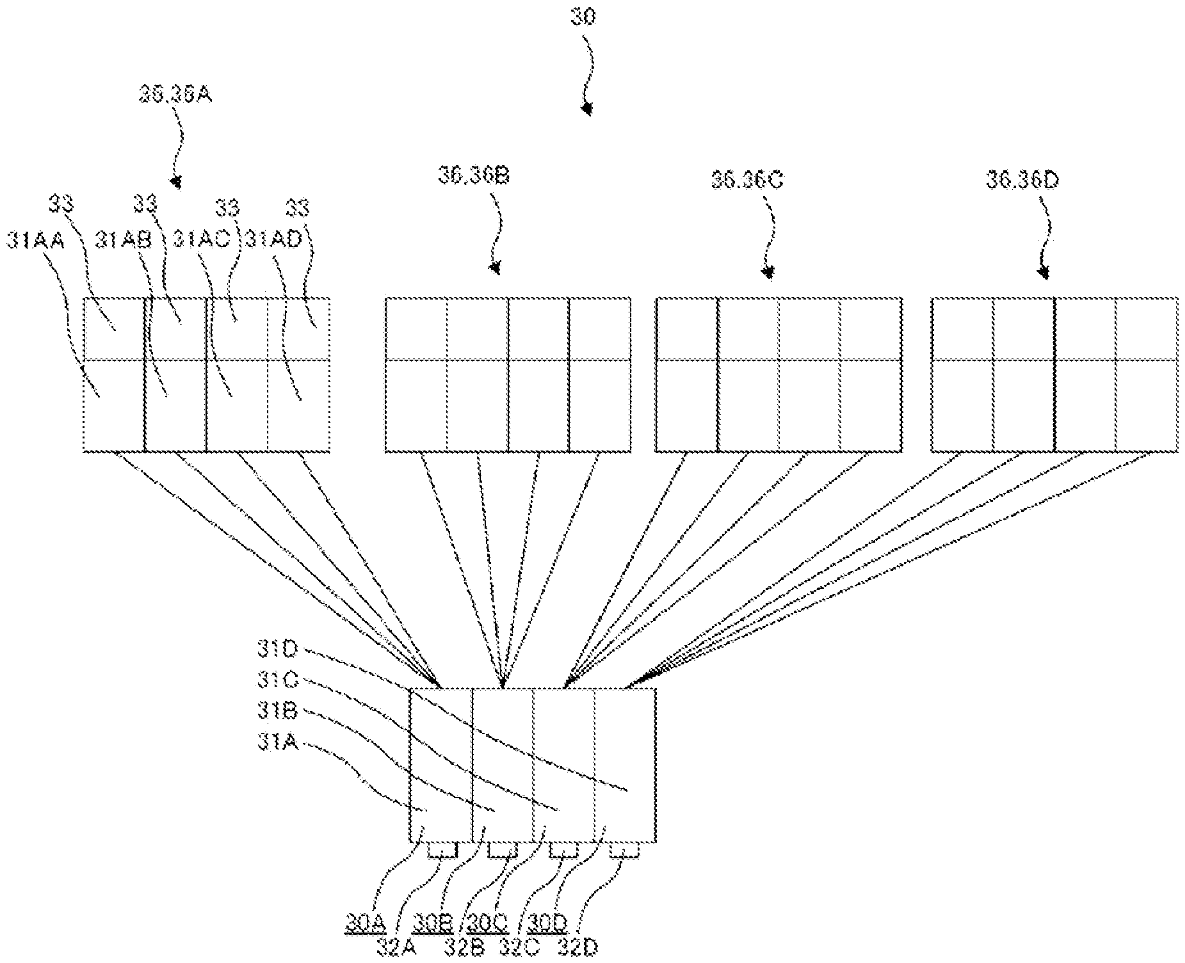
FIG. 11 shows a modification of the head 30 of the printing apparatus 100 of Embodiment 1.

FIG. 11 shows a modification of the head 30 of the printing apparatus 100 of Embodiment 1. In the above-mentioned description, the description has been made for the printing apparatus 100 that includes the head 30 configured such that one of the plurality of storage portions 31 stores intermediate color ink. However, the printing apparatus 100 may be configured such that each of the heads 30A to 30D forming the head 30 stores the inks 40 of a plurality of colors.

FIG. 11 schematically shows the detailed structure of the head 30, and the specific structure may be suitably changed. The head 30 shown in FIG. 11 includes at least four heads consisting of the heads 30A to 30D, and the heads 30A to 30D respectively include the nozzles 32A to 32D. The storage portion 31A of the head 30A is connected to an ink tank unit 36A. The ink tank unit 36A is configured to include sub-storage portions 31AA, 31AB, 31AC and 31AD to store four kinds of inks 40. Inks of the three primary colors and black ink, for example, are respectively stored in the sub-storage portions 31AA, 31AB, 31AC and 31AD. Each of the sub-storage portions 31AA, 31AB, 31AC and 31AD includes the pressure device 35. The head 30A is configured such that the inks 40 stored in the sub-storage portions 31AA, 31AB, 31AC and 31AD are caused to flow into the storage portion 31A at a desired ratio and to be mixed.

In the head 30 shown in FIG. 11, not only that the head 30A includes the ink tank unit 36A, but also that the heads 30B to 30D also respectively include ink tank units 36B to 36D. Each of the ink tank units 36B to 36D has a structure equal to the structure of the ink tank unit 36A, and the ink tank units 36B to 36D may be collectively referred to as an "ink tank unit 36". In the same manner as the head 30A, a plurality of inks 40 stored in the sub-storage portions 31AA, 31AB, 31AC and 31AD of the ink tank unit 36 can be mixed in each of the storage portions 31B to 31D. Accordingly, also in each of the storage portions 31B to 31D, the inks 40 stored in the plurality of sub-storage portions 31AA, 31AB, 31AC and 31AD can be mixed at a desired ratio. A configuration may also be adopted where some of the heads 30A to 30D are not connected to the ink tank units 36 and each of such heads includes only a single storage portion 31.

With the head 30 shown in FIG. 11, a desired intermediate color ink can be formed in each of the storage portions 31A to 31D of each of the heads 30A to 30D forming the head 30 and hence, the head 30 can accommodate a print image with various hues. That is to say, printing can be performed by forming inks of different intermediate colors in the respective heads 30A to 30D. Alternatively, only one of inks stored in the sub-storage portions 31AA, 31AB, 31AC and 31AD may be caused to flow into each of the heads 30A to 30D. Printing may be performed with only red, blue, yellow, and black. However, with the head 30 shown in FIG. 11, desired intermediate color can be formed in each of the storage portions 31A to 31D. Accordingly, the printing apparatus 100 can accommodate a print image at a higher definition.

The printing apparatus 100 that includes the head 30 shown in FIG. 11 may include the cleansing device 88 that cleanses the head 30. The head 30 shown in FIG. 11 may be configured such that the nozzles 32A to 32D and the storage portions 31A to 31D can be replaced. The printing apparatus 100 is configured such that the storage portions 31A to 31D and the nozzles 32A to 32D of the head 30 can be replaced. Therefore, when a failure, such as clogging of ink, occurs in the nozzle 32, production can be continued by only replacing the head 30. Further, color of ink can be changed corresponding to the item to be printed 70 and hence, many kinds of items to be printed 70 can be produced.

REFERENCE SIGNS LIST

1: inner layer, 2: outer layer, 3: protective film layer, 4: printing surface, 5: base, 6: top portion, 7: support member, 10: printing pad, 11: vertically moving device, 12: horizontally moving device, 13: flat surface, 30: head, 30A: head, 30B: head, 30C: head, 30D: head, 30E: head, 31: storage portion, 31A: storage portion, 31AA: sub-storage portion, 31AB: sub-storage portion, 31AC: sub-storage portion, 31AD: sub-storage portion, 31B: storage portion, 31C: storage portion, 31D: storage portion, 31E: storage portion, 32: nozzle, 32A: nozzle, 32B: nozzle, 32C: nozzle, 32D: nozzle, 32E: nozzle, 33: moving rail, 34: drying device, 35: pressure device, 36: ink tank unit, 36A: ink tank unit, 36B: ink tank unit, 36C: ink tank unit, 36D: ink tank unit, 40: ink, 50: printing original plate, 51: placement surface, 60: cleaning device, 61: activation device, 62: air blowing device, 70: item to be printed, 71: surface to be printed, 72: surface to be printed, 73: surface to be printed, 80: ultraviolet ray irradiation device, 81: light source, 85: printing original plate stage, 86: surface treatment stage, 87: printing stage, 88: cleansing device, 100: printing apparatus, 110: printing pad, 170: item to be printed.

The invention claimed is:

1. A printing apparatus comprising:

a printing pad having a printing surface that is deformable to conform to a shape of a surface to be printed;

a printing original plate having a placement surface on which ink is placed;

a printing original plate stage on which the printing original plate is placed;

a printing stage on which an item to be printed having the surface to be printed is placed and fixed;

a head configured to print an image on the printing original plate by an ink jet system; and a cleaning device configured to remove from the printing surface, by pressure of the printing pad against a surface of the cleaning device, substance on the printing surface remaining after printing, the printing pad being configured to be moveable between an area above the printing original plate stage, an area above the printing stage, and an area above the cleaning device, and being configured to move perpendicularly to and vertically from and to the printing original plate stage, the printing stage, and the cleaning device, the head including a plurality of storage portions configured to store a plurality of inks including intermediate color ink, and nozzles configured to discharge each of the plurality of inks toward the printing original plate, wherein each of the plurality of storage portions includes a respective plurality of sub-storage portions configured to store each of a plurality of inks that are allowed to be mixed together in the respective storage portion of the plurality of storage portions.

2. The printing apparatus of claim 1, wherein the plurality of storage portions include at least five storage portions, and at least one of the plurality of storage portions is filled with the intermediate color ink.

3. The printing apparatus of claim 1 further comprising a cleansing device configured to cleanse the head.

4. The printing apparatus of claim 1, wherein each of the plurality of storage portions is configured to be detachably mounted on the head.

5. The printing apparatus of claim 1, further comprising an activation device configured to cause to adhere to the printing surface, by pressure of the printing pad against a surface of the activation device, liquid configured to soften the ink.

6. The printing apparatus of claim 5, further comprising an air blowing device configured to adjust an amount of the liquid caused to adhere to the printing surface.

7. A printing method that uses the printing apparatus of claim 1, the printing method comprising:

a printing original plate preparation step of discharging a plurality of inks of different colors including intermediate color ink to the printing original plate from the head by an ink jet system to print the image on the printing original plate;

an ink drying step of evaporating a solvent contained in the plurality of inks forming the image on the printing original plate to increase a viscosity of the plurality of inks;

a transfer step of transferring the image to a surface of the printing pad; and a printing step of pushing the printing pad against an item to be printed.

8. The printing method of claim 7, wherein in the printing original plate preparation step, dots of the intermediate color ink and dots of the plurality of inks of a color different from a color of the intermediate color ink are arranged at a predetermined ratio per unit area in at least a portion of the image.

9. A printing apparatus comprising:

a printing pad having a printing surface that is deformable to conform to a shape of a surface to be printed;

a printing original plate having a placement surface on which ink is placed;

a printing original plate stage on which the printing original plate is placed;

a printing stage on which an item to be printed having the surface to be printed is placed and fixed;

a head configured to print an image on the printing original plate by an ink jet system; and an activation device configured to cause to adhere to the printing surface, by pressure of the printing pad against a surface of the activation device, liquid configured to soften the ink, the printing pad being configured to be moveable between an area above the printing original plate stage, an area above the printing stage, and an area above the activation device, and being configured to move perpendicularly to and vertically from and to the printing original plate stage, the printing stage, and the activation device, the head including a plurality of storage portions configured to store a plurality of inks including intermediate color ink, and nozzles configured to discharge each of the plurality of inks toward the printing original plate, wherein each of the plurality of storage portions includes a respective plurality of sub-storage portions configured to store each of a plurality of inks that are allowed to be mixed together in the respective storage portion of the plurality of storage portions.

10. The printing apparatus of claim 9, further comprising an air blowing device configured to adjust an amount of the liquid caused to adhere to the printing surface.

* * * * *